United States Patent
Takahashi et al.

(10) Patent No.: US 9,221,386 B2
(45) Date of Patent: Dec. 29, 2015

(54) WARNING DEVICE FOR JUDGING WHETHER OCCUPANT IS VISUALLY DISTRACTED

(75) Inventors: Akio Takahashi, Tochigi-ken (JP); Shinsuke Ueda, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 14/349,500

(22) PCT Filed: Jun. 6, 2012

(86) PCT No.: PCT/JP2012/064511
§ 371 (c)(1),
(2), (4) Date: Apr. 3, 2014

(87) PCT Pub. No.: WO2013/051307
PCT Pub. Date: Apr. 11, 2013

(65) Prior Publication Data
US 2014/0225725 A1    Aug. 14, 2014

(30) Foreign Application Priority Data

Oct. 6, 2011   (JP) .................................. 2011-221739

(51) Int. Cl.
*B60Q 1/00*   (2006.01)
*B60K 28/02*   (2006.01)
(Continued)

(52) U.S. Cl.
CPC . *B60Q 1/00* (2013.01); *B60K 28/02* (2013.01); *B60K 28/066* (2013.01); *G06K 9/00845* (2013.01); *G08G 1/16* (2013.01)

(58) Field of Classification Search
CPC ...... A42B 3/044; B60Q 1/50; B60Q 2400/50; B60R 1/00; B60R 2021/0018; B60R 2021/01315; B60R 2021/01327; B60R 2021/23316; B60R 21/013; B60R 21/207; B60R 21/23138; B60R 2300/106; B60R 2300/207
USPC ................. 340/439, 461, 435–436, 525, 443, 340/458–459, 463, 465, 468, 488, 539.22
See application file for complete search history.

(56) References Cited

U.S. PATENT DOCUMENTS 6,198,484 B1 *   3/2001   Kameyama ................... 345/419
6,426,755 B1 *   7/2002   Deering ........................ 345/581
(Continued)

FOREIGN PATENT DOCUMENTS

CN   101336827   1/2009
JP   2007-072629   3/2007
(Continued)

OTHER PUBLICATIONS

Japanese Notice of Allowance with partial English translation dated Nov. 25, 2014, 4 pages.
(Continued)

*Primary Examiner* — Daniel Previl
(74) *Attorney, Agent, or Firm* — Rankin, Hill & Clark LLP

(57) ABSTRACT

A warning device that is highly effective in encouraging a driver to stop visually distracted driving. The warning device includes a visually-distracted-driving determination unit and a warning unit. The visually-distracted driving determination unit determines that a driver is visually distracted if the direction in which the driver is looking is greater than or equal to a predetermined angle with respect to the front of the driver. The warning unit issues a visual warning at a position visible to the driver when the visually-distracted-driving determination unit determines that the driver is visually distracted. The warning unit is arranged on a virtual boundary line forming the predetermined angle with the front of the driver on the right and/or left side thereof.

4 Claims, 11 Drawing Sheets

(51) Int. Cl.
  *B60K 28/06* (2006.01)
  *G06K 9/00* (2006.01)
  *G08G 1/16* (2006.01)

(56) References Cited

U.S. PATENT DOCUMENTS

| | | | |
|---|---|---|---|
| 6,564,122 B1* | 5/2003 | Huertgen et al. | 701/1 |
| 2006/0238707 A1* | 10/2006 | Elvesjo et al. | 351/209 |
| 2007/0159839 A1* | 7/2007 | Komatsu | 362/538 |
| 2009/0009309 A1 | 1/2009 | Matsuoka et al. | |
| 2010/0149073 A1* | 6/2010 | Chaum et al. | 345/8 |
| 2010/0253594 A1* | 10/2010 | Szczerba et al. | 345/7 |
| 2011/0013007 A1* | 1/2011 | Holmberg et al. | 348/78 |

FOREIGN PATENT DOCUMENTS

| | | |
|---|---|---|
| JP | 2007-257173 | 10/2007 |
| JP | 2007-334598 | 12/2007 |
| JP | 2008-217693 | 9/2008 |
| JP | 2009-093284 | 4/2009 |
| JP | 2009-113770 | 5/2009 |
| JP | 2010-105417 | 5/2010 |
| JP | 2010-155496 | 7/2010 |
| JP | 2011-116210 | 6/2011 |
| JP | 2012-014257 | 1/2012 |

OTHER PUBLICATIONS

European Search Report dated Aug. 17, 2015.
Yang, et al. "A Study on Detection of Driver's Vision During Safe Driving"; published on Apr. 25, 2010, the 18th volume, the 4th term, with English translation, 11 pages.
Chinese Office Action with Search Report dated Apr. 22, 2015 including partial English translation, 7 pages.

* cited by examiner

WARNING DEVICE FOR JUDGING WHETHER OCCUPANT IS VISUALLY DISTRACTED

TECHNICAL FIELD

The present invention relates to a warning apparatus (warning device) for detecting a visual distraction of an occupant of a vehicle, i.e., a driver or the like, and warning the occupant.

BACKGROUND ART

There has been proposed an apparatus for drawing attention of the driver or the like if the driver of a vehicle is visually distracted. See, Japanese Laid-Open Patent Publication No. 2007-334598 (hereinafter referred to as "JP2007-334598A"). According to JP2007-334598A, a visual distraction warning apparatus 60 for warning the driver is disposed in a position, which cannot be seen if the driver is watching in a forward direction, and which can be seen when the driver is visually distracted (see Abstract). The visual distraction warning apparatus 60 is operated if it is judged that the possibility of an accident during travel of the vehicle has a predetermined level or greater, i.e., if a collision expecting time T is equal to or less than predetermined values T1, T2 (see Abstract, FIG. 6, and paragraphs [0032] through [0049]).

The visual distraction warning apparatus 60 includes foot illuminating lamps 61a, 61b, 61c for illuminating foot positions in front of a driver seat or a front passenger seat, side lamps 61d, 61e disposed behind front pillars, a central panel indication lamp 61f disposed on a central operation panel, and a console illuminating lamp 61g for illuminating a console (see Abstract, FIGS. 2, 3). The lamps 61a through 61g are turned on and off by a common switching device 62 (see FIG. 1, paragraph [0030]). Therefore, the lamps 61a through 61g are selectively turned on and off simultaneously.

SUMMARY OF INVENTION

According to JP2007-334598A, as described above, if it is judged that the possibility of an accident during travel of the vehicle has a predetermined level or greater, the lamps 61a through 61g are turned on simultaneously to draw the attention of the driver and thus prevent the driver from being visually distracted. More specifically, according to JP2007-334598A, a visual distraction of the driver is not detected per se for drawing the driver's attention, but rather, the lamps 61a through 61g, which can be visually recognized when the driver is visually distracted, are turned on. If the driver visually recognizes any one of the lamps 61a through 61g that are turned on in this manner, then since the driver is visually distracted, the visual recognition of either one of the lamps serves to draw the attention of the driver to the fact that the driver is visually distracted (see paragraph [0040]). According to JP2007-334598A, there is still room for improvements in effectiveness to prompt the driver and stop the driver from being visually distracted.

The present invention has been made in view of the aforementioned problems. An object of the present invention is to provide a warning apparatus, which is highly effective at prompting the driver of a vehicle to thereby stop the driver from being visually distracted.

According to the present invention, there is provided a warning apparatus comprising a gazing direction detecting unit for detecting a gazing direction of an occupant of a vehicle based on a viewing direction or a facial direction of the occupant, a visual distraction judging unit for judging that the occupant is visually distracted if the gazing direction of the occupant is angularly spaced from a front direction of the occupant by a predetermined angle or greater, and a warning unit for issuing a visual warning at a position that can be recognized visually by the occupant if the visual distraction judging unit judges that the occupant is visually distracted, wherein the warning unit is disposed on at least one hypothetical boundary line positioned at the predetermined angle from the front direction of the occupant on at least one of left and right sides of the front direction of the occupant.

According to the present invention, the warning unit is disposed on a hypothetical boundary line, which is positioned at the predetermined angle from the front direction of the occupant. Since the predetermined angle represents a boundary which is used to judge whether or not the occupant is visually distracted, the warning unit is disposed on the hypothetical boundary line, which serves to judge whether a visual warning should be issued or not. If the occupant is visually distracted, a visual warning is issued in the gazing direction of the occupant, thereby allowing the occupant to easily recognize the occurrence of the visual distraction. Consequently, the warning apparatus is highly effective at prompting the occupant to stop from being visually distracted, i.e., to draw the attention of the occupant. If the gazing direction of the occupant exceeds the predetermined angle, i.e., if the occupant is gazing in a more outward direction than the warning unit, then the visual warning is emitted more inwardly, i.e., more closely to the front direction. Thus, it can be expected that the occupant will be prompted to turn his or her face toward the front direction of the occupant. As described above, the warning unit is disposed on the hypothetical boundary line, which serves to judge whether or not a visual warning should be issued. If a warning is issued, even if the occupant is gazing more inwardly than the warning unit, or if a warning is not issued, even if the occupant is gazing more outwardly than the warning unit, the occupant can recognize that a fault of some kind is occurring.

The warning unit may be in the form of a rod that extends along the hypothetical boundary line, and issues the visual warning by emitting light. Therefore, the occupant finds it easy to recall the hypothetical boundary line per se, which is used to judge whether the occupant is visually distracted or not, i.e., to judge whether a visual warning should be issued or not. Stated otherwise, the warning unit serves as a mark for the hypothetical boundary line. Consequently, when the gazing direction is about to move beyond the hypothetical boundary line, it can be expected that the occupant will not be visually distracted unnecessarily by recognizing a light emitter that is not emitting light.

The warning unit may comprise a first light emitter disposed in a horizontal direction along an instrument panel of the vehicle. Inasmuch as the first light emitter is disposed in a horizontal direction along the instrument panel, the occupant is able to recall the hypothetical boundary line easily, without the vision of the occupant being obstructed. Furthermore, by imaging the hypothetical boundary line as extending farther, the occupant is prompted to recall the hypothetical boundary line.

The hypothetical boundary line may comprise two hypothetical boundary lines disposed respectively on the left and right sides of the front direction of the occupant. The first light emitter may be disposed on one of the hypothetical boundary lines on one of the left and right sides that is remote from the occupant, and the warning unit may further comprise a second light emitter disposed in a vertical direction on the other of the hypothetical boundary lines on the other of the left and right sides that is proximate to the occupant. Since the first light emitter extends horizontally, the first light emitter prompts the occupant to recall a horizontal direction in a first hypothetical plane, which includes one of the boundary lines. Since the second light emitter extends vertically, the second light emitter prompts the occupant to recall a vertical direction in a second hypothetical plane, which includes the other one of the boundary lines. Consequently, the positions of the first light emitter and the second light emitter are combined in a manner to prompt the occupant easily to recall the first hypothetical plane and the second hypothetical plane, thereby prompting the occupant to recall spatial boundaries that are used to judge whether or not the occupant is visually distracted.

DESCRIPTION OF EMBODIMENTS

A. First Embodiment

1. Description of Overall Arrangement
[1-1. Overall Arrangement]

Figure 1:
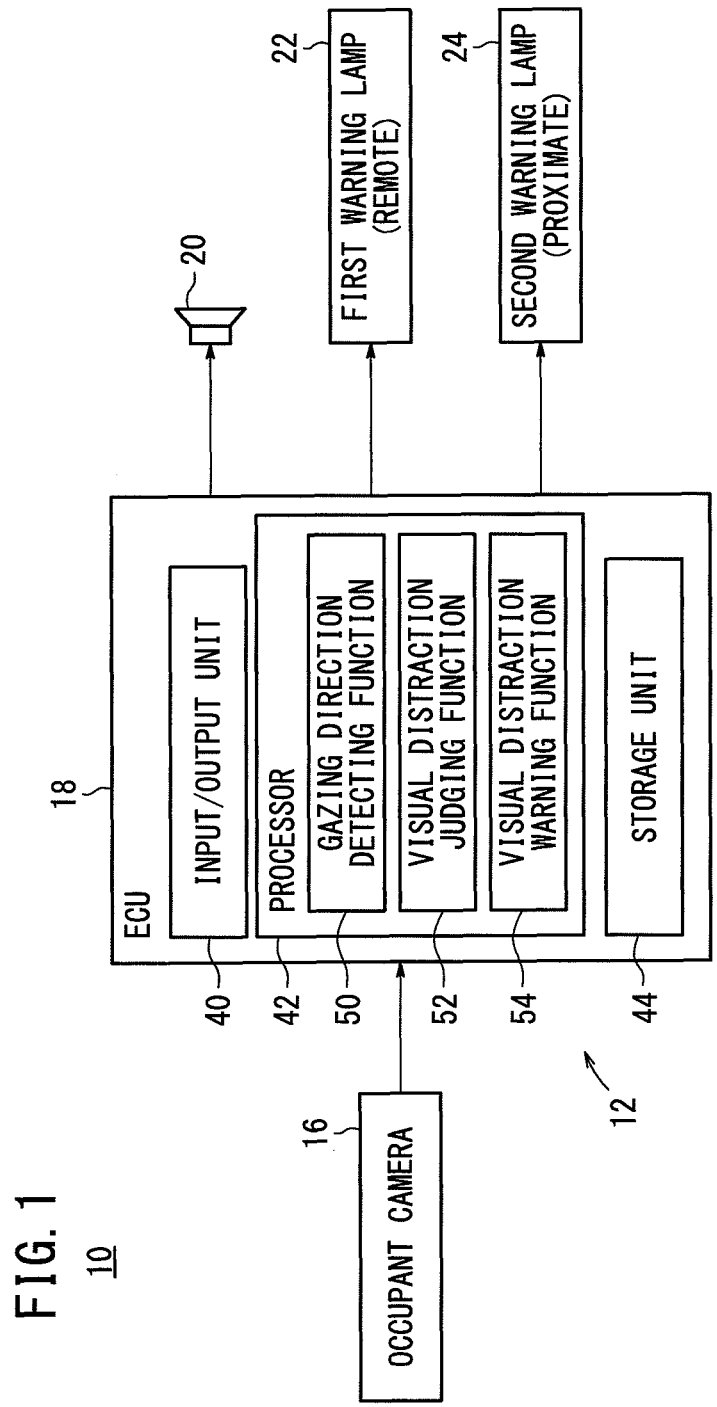
FIG. 1 is an overall block diagram of a vehicle, which incorporates therein a visual distraction warning apparatus as a warning apparatus according to a first embodiment of the present invention.
Figure 2:
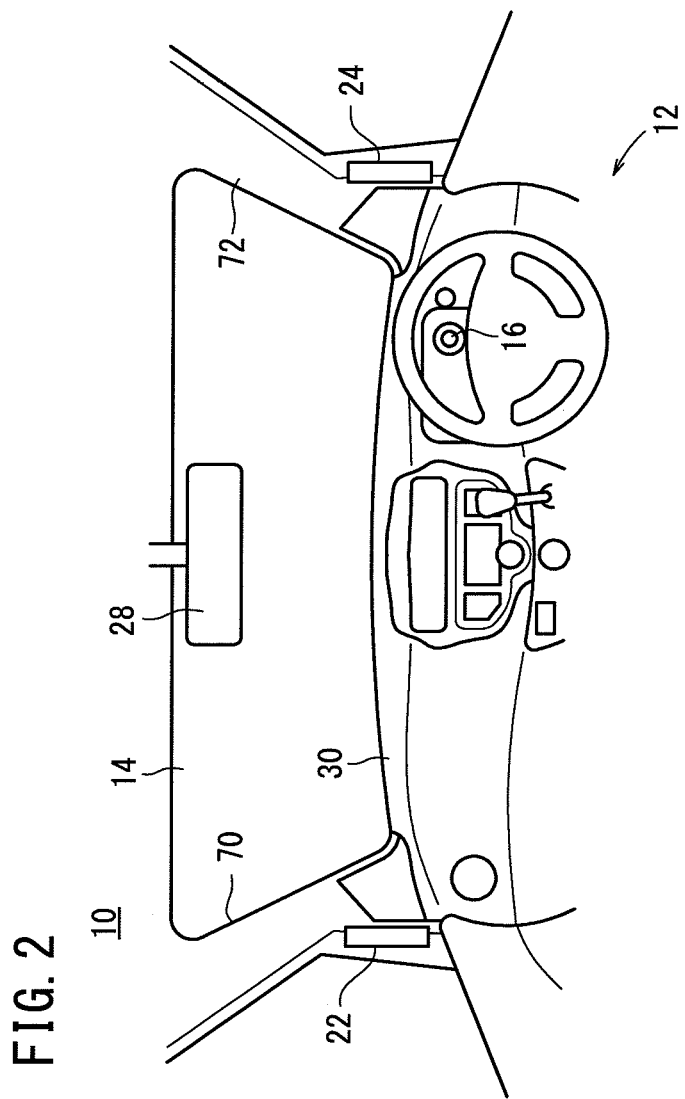
FIG. 2 is a view showing a peripheral area around a front windshield of the vehicle according to the first embodiment.

FIG. 1 is an overall block diagram of a vehicle 10 that incorporates therein a visual distraction warning apparatus 12 (hereinafter referred to as a "warning apparatus 12") as a warning apparatus according to a first embodiment of the present invention. FIG. 2 is a view showing a peripheral area around a front windshield 14 of the vehicle 10. As shown in FIGS. 1 and 2, the warning apparatus 12 includes an occupant camera 16, an electronic control unit 18 (hereinafter referred to as an "ECU 18"), a speaker 20, a first warning lamp 22, and a second warning lamp 24. As shown in FIG. 2, the vehicle 10 according to the first embodiment is a so-called right-hand drive vehicle. Alternatively, the vehicle 10 may be a left-hand drive vehicle having the same arrangement as described above.

[1-2. Occupant Camera 16]

As shown in FIG. 2, the occupant camera 16 (image capturing unit) is mounted on a steering column, not shown, directly in front of the driver. The occupant camera 16 captures an image of the face (head) of the driver (hereinafter referred to as a "facial image"). The occupant camera 16 is not limited in position to the illustrated position, but may be positioned near a rearview mirror 28 (see FIG. 2) or on an instrument panel 30. The occupant camera 16 is not limited to a camera for capturing an image in one direction, but may be a camera for capturing images in multiple directions (a so-called stereo camera). The occupant camera 16, for example, may be a color camera, a monochromatic camera, or a near-infrared camera.

[1-3. ECU 18]

As shown in FIG. 1, ECU 18, which serves to control the visual distraction warning apparatus 12, includes an input/output unit 40, a processor 42, and a storage unit 44. The input/output unit 40 is used to communicate with the occupant camera 16, the speaker 20, the first warning lamp 22, and the second warning lamp 24.

As shown in FIG. 1, the processor 42 includes a gazing direction detecting function 50, a visual distraction judging function 52, and a visual distraction warning function 54. The gazing direction detecting function 50 (gazing direction detecting unit) detects a gazing direction of the driver based on at least one of the viewing direction (eyeball direction) and the facial direction of the driver (occupant).

The visual distraction judging function 52 (visual distraction judging unit) judges whether or not the driver is visually distracted based on the gazing direction of the driver. If the visual distraction judging function 52 judges that the driver is visually distracted, then the visual distraction warning function 54 issues a warning against the visual distraction (hereinafter referred to as a "visual distraction warning"). According to the first embodiment, the visual distraction warning is issued by lighting or blinking of the first warning lamp 22 or the second warning lamp 24. The visual distraction warning may also be issued as a warning sound from the speaker 20.

[1-4. Speaker 20]

The speaker 20 is used to produce a warning sound output as a visual distraction warning based on a command from the ECU 18 (visual distraction warning function 54). The speaker 20 may also be used for other purposes, such as producing sound outputs from radio broadcasts, television broadcasts, and audio devices, not shown, as well as taking part in route guidance given by a navigation device, not shown.

[1-5. First Warning Lamp 22 and Second Warning Lamp 24]

The first warning lamp 22 (warning unit, first light emitter) and the second warning lamp 24 (warning unit, second light emitter) serve to warn the driver against a visual distraction, i.e., to draw the attention of the driver. Each of the first warning lamp 22 and the second warning lamp 24 comprises an illuminating device such as a light-emitting diode (LED), a fluorescent lamp, or the like. When the ECU 18 (visual distraction judging function 52) detects that the driver is visually distracted, the ECU 18 causes the first warning lamp 22 or the second warning lamp 24 to light or blink depending on the direction of the visual distraction. The layout of the first warning lamp 22 and the second warning lamp 24 will be described in detail later.

Figure 3:
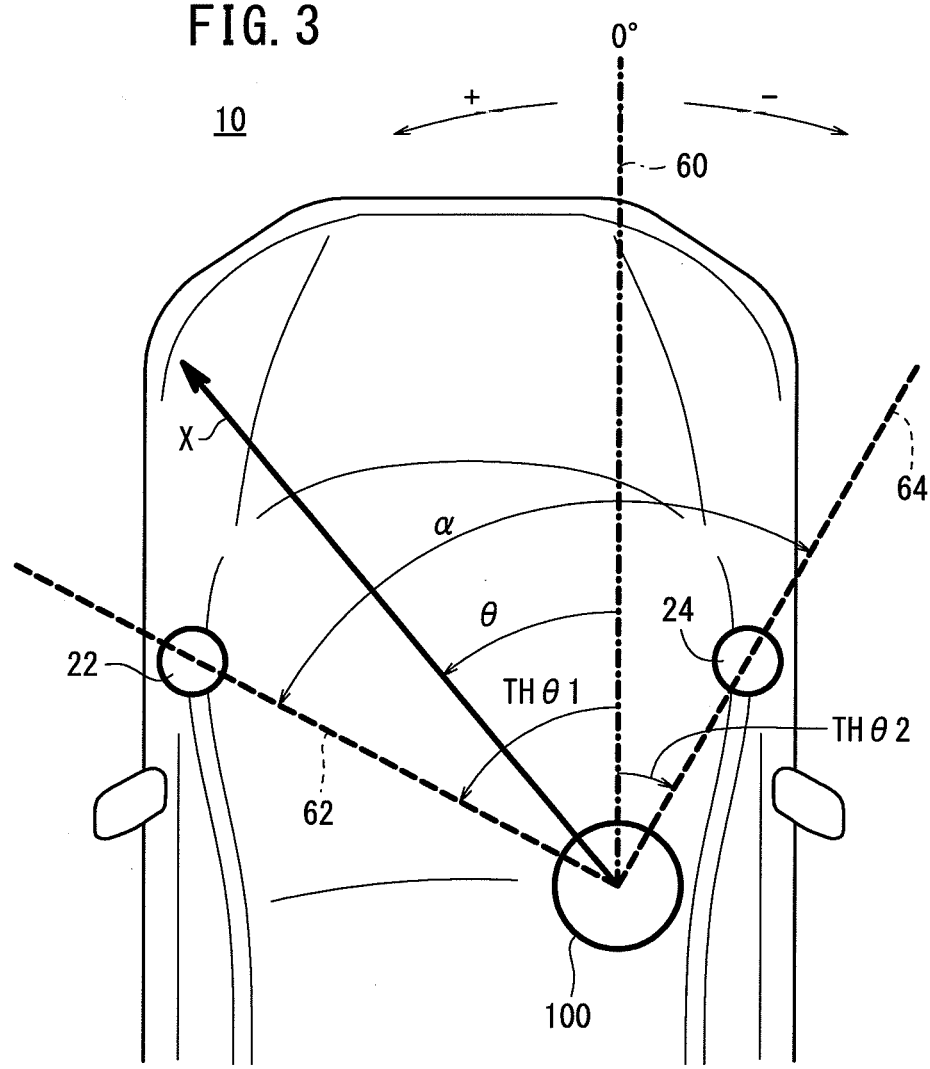
FIG. 3 is a plan view illustrating the layout of a first warning lamp and a second warning lamp according to the first embodiment.
Figure 4:
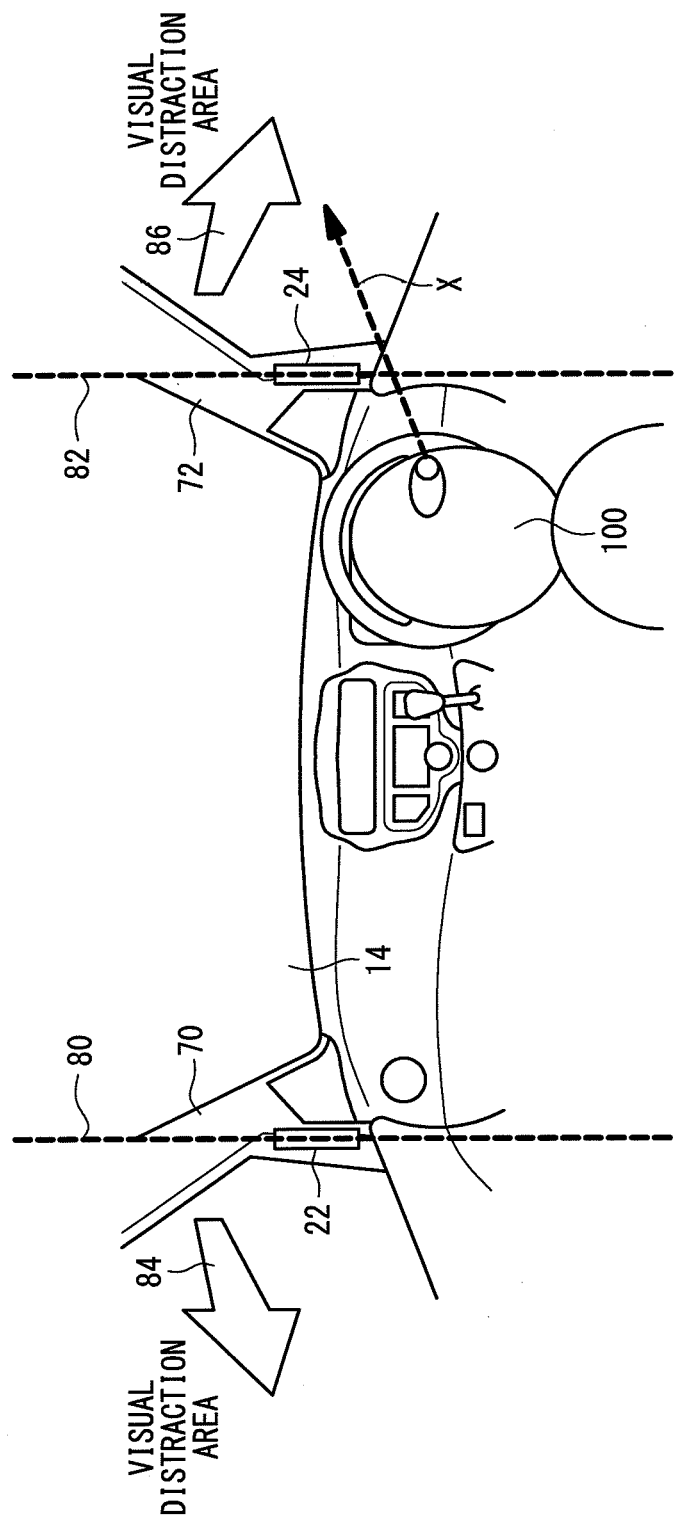
FIG. 4 is a view of the peripheral area around the front windshield, illustrating the relationship between the layout of the first warning lamp and the second warning lamp, and visual distraction areas according to the first embodiment.
Figure 5:
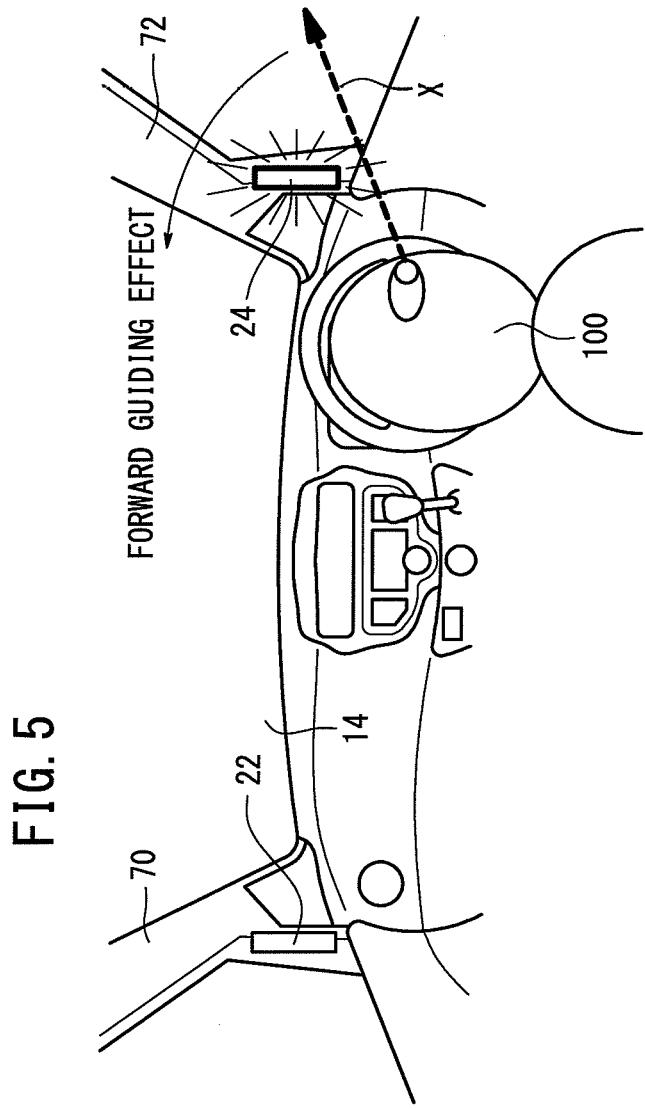
FIG. 5 is a view of the peripheral area around the front windshield, illustrating an effect produced when the second warning lamp according to the first embodiment lights.

2. Layout of First Warning Lamp 22 and Second Warning Lamp 24, and Visual Distraction Areas FIG. 3 is a plan view illustrating the layout of the first warning lamp 22 and the second warning lamp 24. FIG. 4 is a view of a peripheral area around the front windshield 14, illustrating the relationship between the layout of the first warning lamp 22 and the second warning lamp 24, and visual distraction areas. FIG. 5 is a view of a peripheral area around the front windshield 14, illustrating an effect produced when the second warning lamp 24 lights.

In FIG. 3, reference numeral "60" denotes a line (hereinafter referred to as a "central line 60") indicating the front direction of the driver 100, or the front direction of the vehicle 10 in the position of the driver 100, and "θ" indicates an angle (hereinafter referred to as a "gazing angle θ") of the gazing direction X of the driver 100 from the central line 60. For ease of illustration, it is assumed that the gazing angle θ0 on the left side (counterclockwise) of the central line 60 (zero) is of a positive value, whereas the gazing angle θ on the right side (clockwise) of the central line 60 is of a negative value. The character "α" denotes a range (hereinafter referred to as a "non-visual-distraction area α"), which is judged by the ECU 18 (visual distraction judging function 52) as being a range within which the driver 100 is not visually distracted. Reference numeral "62" denotes a hypothetical boundary line indicating the left end of the non-visual-distraction area α, and reference numeral "64" denotes a hypothetical boundary line indicating the right end of the non-visual-distraction area α. Such hypothetical boundary lines will hereinafter be referred to as "visual distraction judgment boundary lines 62, 64" or simply "boundary lines 62, 64".

As shown in FIG. 3, the first warning lamp 22 is disposed on the left boundary line 62. Stated otherwise, the boundary line 62 represents a line that interconnects the center of the driver 100 and the first warning lamp 22. According to the first embodiment, the first warning lamp 22 is disposed on a front left pillar 70. Similarly, the second warning lamp 24 is disposed on the right boundary line 64. Stated otherwise, the boundary line 64 represents a line that interconnects the center of the driver 100 and the second warning lamp 24. According to the first embodiment, the second warning lamp 24 is disposed on a front right pillar 72.

In FIG. 4, reference numeral "80" denotes a hypothetical line (hereinafter referred to as a "first axis 80") representing the longitudinal axis of the first warning lamp 22, and reference numeral "82" denotes a hypothetical line (hereinafter referred to as a "second axis 82") representing the longitudinal axis of the second warning lamp 24. As shown in FIG. 4, each of the first warning lamp 22 and the second warning lamp 24 is in the form of a rod that extends in a vertical direction. The vertical directions referred to above represent directions in a range from 0 to ±30° from a perfect vertical direction (0°) longitudinally and transversely of the vehicle 10.

As shown in FIG. 4, an area indicated by the arrow 84, i.e., an area faced by the driver 100 on the left-hand side of the first axis 80 (counterclockwise), is referred to as an area (hereinafter referred to as a "visual distraction area") in which the ECU 18 (visual distraction judging function 52) judges that the driver 100 is visually distracted. Similarly, an area indicated by the arrow 86, i.e., an area faced by the driver 100 on the right-hand side of the second axis 82 (clockwise), also is referred to as a visual distraction area.

Accordingly, even if the first warning lamp 22 and the second warning lamp 24 are not made to light or blink, using the first warning lamp 22 and the second warning lamp 24 as marks (see FIG. 4), the driver 100 is able to recognize the visual distraction areas.

Further, when the first warning lamp 22 or the second warning lamp 24 is made to light or blink upon the occurrence of a visual distraction by the driver 100, the first warning lamp 22 or the second warning lamp 24 makes it easy for the driver 100 to realize the visual distraction. Since the attention of the driver 100 is drawn to the first warning lamp 22 or the second warning lamp 24, which is made to light or blink, an effect (forward guiding effect) can be expected in which the gazing direction X of the driver 100 is guided toward the central line 60, i.e., to the front direction of the vehicle 10 (see FIG. 5).

3. Control Process of the First Embodiment

Figure 6:
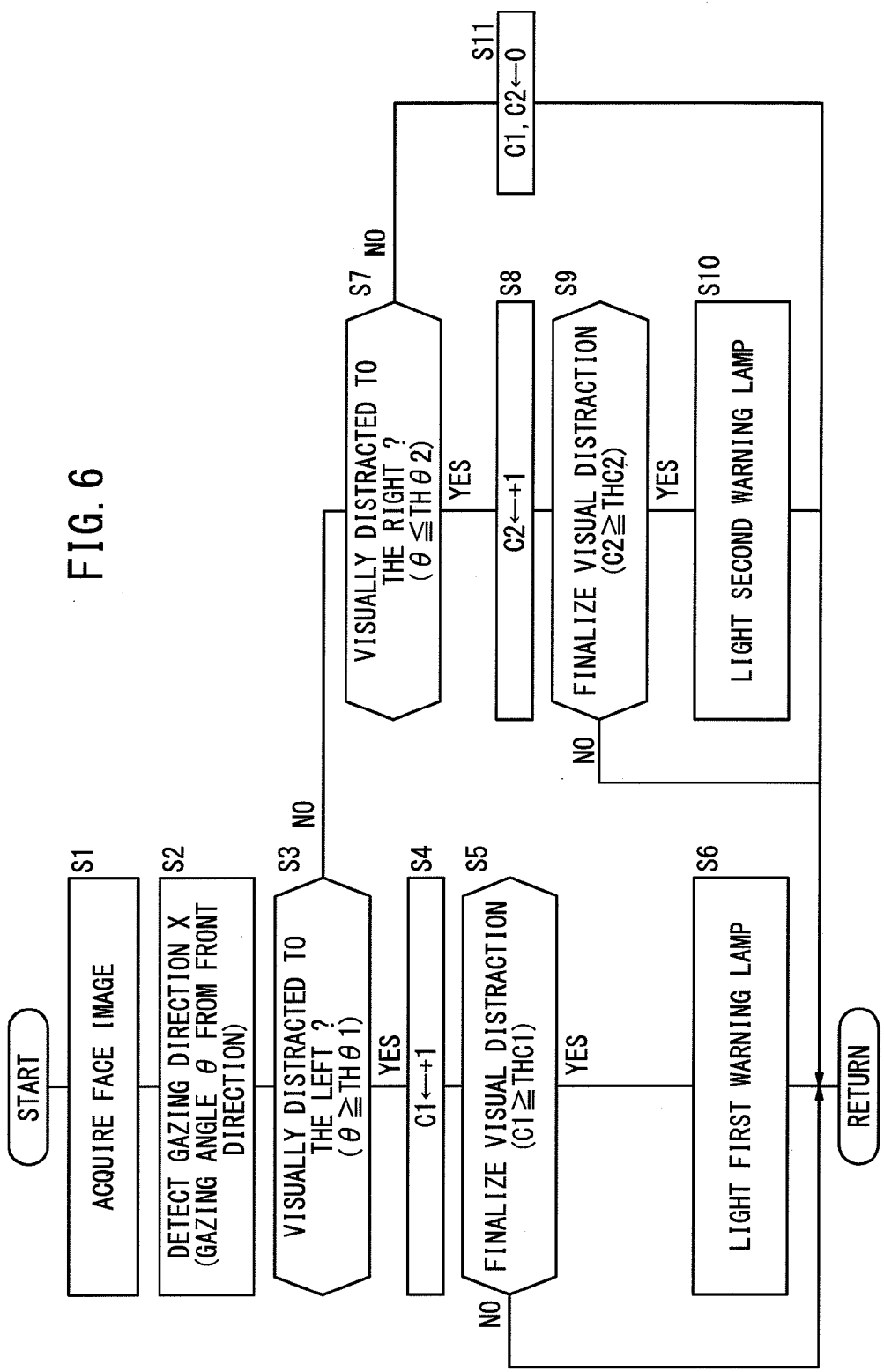
FIG. 6 is a flowchart of an operational sequence of the visual distraction warning apparatus according to the first embodiment upon detection of a visual distraction.

FIG. 6 is a flowchart of an operational sequence of the visual distraction warning apparatus 12 according to the first embodiment upon detection of a visual distraction. In step S1, the occupant camera 16 acquires a facial image of the driver 100. In step S2, based on the facial image of the driver 100 that was acquired by the occupant camera 16, the ECU 18 (gazing direction detecting function 50) detects a gazing direction X (gazing angle θ) of the driver 100.

A viewing direction of the driver 100 can be detected by the method described in Japanese Laid-Open Patent Publication No. 2010-105417 (see paragraphs [0014] through [0016], for example).

The facial direction of the driver 100 can be detected in the following manner, for example. Based on the facial image captured by the occupant camera 16, the ECU 18 (gazing direction detecting function 50) detects the central position of the face along with left and right end positions of the face. Based on the detected positions, the ECU 18 approximates the face of the driver 100 to be a cylindrical shape, for example, and calculates the facial direction (cylinder process).

In step S3, using the gazing direction X (gazing angle θ), the ECU 18 (visual distraction judging function 52) judges whether or not the driver 100 is visually distracted to the left. More specifically, the ECU 18 judges whether or not the gazing angle θ is equal to or greater than a leftward visual distraction judgment threshold value THθ1 (hereinafter referred to as a "threshold value THθ1"). The threshold value THθ1 refers to a threshold value (a positive value according to the present embodiment) for judging whether or not the driver 100 is visually distracted to the left. The threshold value THθ1 is preset and is stored in the storage unit 44. The threshold value THθ1 is defined by an angle formed by the boundary line 62 with respect to the central line 60.

If the driver 100 is visually distracted to the left (step S3: YES), then in step S4, the ECU 18 (visual distraction judging function 52) increments a visual distraction judging count value C1 (hereinafter referred to as a "count value C1") by 1. The count value C1 is used to judge whether or not the judgment that the driver 100 is visually distracted to the left should be finalized.

In step S5, the ECU 18 (visual distraction judging function 52) judges whether or not the judgment that the driver 100 is visually distracted to the left should be finalized. More specifically, the ECU 18 judges whether or not the count value C1 is equal to or greater than a threshold value (hereinafter referred to as a "leftward visual distraction finalizing threshold value THC1" or simply a "threshold value THC1") for finalizing the judgment that the driver 100 is visually distracted to the left. If the count value C1 is not equal to or greater than the threshold value THC1 (step S5: NO), then the present processing cycle is brought to an end, and control returns to step S1 in order for the next processing cycle to be carried out.

If the count value C1 is equal to or greater than the threshold value THC1 (step S5: YES), then the ECU 18 finalizes the judgment that the driver 100 is visually distracted to the left, and in step S6, the ECU 18 (visual distraction warning function 54) causes the first warning lamp 22 to light or blink. At this time, the ECU 18 may control the speaker 20 to generate a warning sound. The ECU 18 may also increase the brightness of the first warning lamp 22 as the gazing angle θ increases. Alternatively, the ECU 18 may increase the blinking rate of the first warning lamp 22 (the number of times that the first warning lamp 22 blinks in a predetermined time) as the gazing angle θ increases.

Returning to step S3, if the driver 100 is not visually distracted to the left (step S3: NO), then in step S7, using the gazing direction X (gazing angle θ), the ECU 18 (visual distraction judging function 52) judges whether or not the driver 100 is visually distracted to the right. More specifically, the ECU 18 judges whether or not the gazing angle θ is equal to or less than a rightward visual distraction judgment threshold value THθ2 (hereinafter referred to as a "threshold value THθ2"), i.e., whether or not the absolute value of the gazing angle θ is equal to or greater than the absolute value of the threshold value THθ2. The threshold value THθ2 refers to a threshold value (a negative value according to the present embodiment) for judging whether or not the driver 100 is visually distracted to the right. The threshold value THθ2 is preset and is stored in the storage unit 44. The threshold value THθ2 is defined by an angle formed by the boundary line 64 with respect to the central line 60. In the foregoing manner, since a rightward angle (clockwise) from the central line 60 is defined as a negative value, the threshold value THθ2 also is of a negative value.

If the driver 100 is visually distracted to the right (step S7: YES), then in step S8, the ECU 18 (visual distraction judging function 52) increments a visual distraction judging count value C2 (hereinafter referred to as a "count value C2") by 1. The count value C2 is used to judge whether or not the judgment that the driver 100 is visually distracted to the right should be finalized. The count value C2 may be used in common with the count value C1.

In step S9, the ECU 18 (visual distraction judging function 52) judges whether or not the judgment that the driver 100 is visually distracted to the right should be finalized. More specifically, the ECU 18 judges whether or not the count value C2 is equal to or greater than a threshold value (hereinafter referred to as a "rightward visual distraction finalizing threshold value THC2" or simply a "threshold value THC2") for finalizing the judgment that the driver 100 is visually distracted to the right. The threshold value THC1 can also be used as is for the threshold value THC2. If the count value C2 is not equal to or greater than the threshold value THC2 (step S9: NO), then the present processing cycle is brought to an end, and control returns to step S1 in order for the next processing cycle to be carried out.

If the count value C2 is equal to or greater than the threshold value THC2 (step S9: YES), then the ECU 18 finalizes the judgment that the driver 100 is visually distracted to the right, and in step S10, the ECU 18 (visual distraction warning function 54) causes the second warning lamp 24 to light or blink. At this time, the ECU 18 may control the speaker 20 to generate a warning sound. The ECU 18 may also increase the brightness of the second warning lamp 24 as the gazing angle θ decreases, or stated otherwise, as the absolute value of the gazing angle θ increases. Alternatively, the ECU 18 may increase the blinking rate of the second warning lamp 24 (the number of times that the second warning lamp 24 blinks in a predetermined time) as the gazing angle θ decreases.

Returning to step S7, if the driver 100 is not visually distracted to the right (step S7: NO), then in step S11, the ECU 18 (visual distraction judging function 52) resets the count values C1, C2. In addition, the present processing cycle is brought to an end, and control returns to step S1.

The visual distraction judging count values C1, C2 have been described as count-up type count values. However, the visual distraction judging count values C1, C2 may be count-down type count values.

4. Advantages of the First Embodiment

According to the first embodiment, as described above, the first warning lamp 22 and the second warning lamp 24 are disposed respectively on the visual distraction judgment boundary lines 62, 64 at predetermined angles (threshold values THθ1, THθ2) from the front direction of the driver 100 (occupant). Since the threshold values THθ1, THθ2 represent boundary lines for judging whether or not the driver 100 is visually distracted, the first warning lamp 22 and the second warning lamp 24, which are disposed respectively on the visual distraction judgment boundary lines 62, 64, serve for determining whether a visual warning should be issued, i.e., whether or not light should be emitted. If the driver 100 is visually distracted, then a visual warning is issued, i.e., light is emitted from the first warning lamp 22 or the second warning lamp 24, in the gazing direction X. Thus, it is easy for the driver 100 to recognize the occurrence of a visual distraction. Consequently, the warning apparatus 12 is highly effective to prompt the driver 100 to stop from being visually distracted, i.e., to draw the attention of the driver 100.

If the gazing direction X exceeds the threshold value THθ1 or THθ2, i.e., if the driver 100 is looking more outwardly than the first warning lamp 22 or the second warning lamp 24, then since the visual warning, i.e., light from the first warning lamp 22 or the second warning lamp 24, is emitted in a more inward direction, i.e., more closely to the front direction, it can be expected that the driver 100 will be prompted to turn his or her face toward the front direction of the driver 100 (see FIG. 5).

As described above, the first warning lamp 22 and the second warning lamp 24 are disposed respectively on the visual distraction judgment boundary lines 62, 64 for judging whether or not a visual warning should be issued, i.e., whether or not light should be emitted. If the first warning lamp 22 or the second warning lamp 24 emits light, even if the driver 100 is looking in a direction more inwardly than the first warning lamp 22 or the second warning lamp 24, or if the first warning lamp 22 or the second warning lamp 24 does not emit light, even if the driver 100 is looking in a direction more outwardly than the first warning lamp 22 or the second warning lamp 24, the driver 100 can recognize that a fault of some kind is occurring.

According to the first embodiment, each of the first warning lamp 22 and the second warning lamp 24 is in the form of a rod that extends along one of the respective visual distraction judgment boundary lines 62, 64, and issues a visual warning by emitting light. Therefore, the driver 100 finds it easy to recall the visual distraction judgment boundary lines 62, 64 per se, which are used to judge whether or not the driver 100 is visually distracted, i.e., to judge whether a visual warning should be issued or not. Consequently, when the gazing direction X is about to move beyond the visual distraction judgment boundary lines 62, 64, it can be expected that the driver 100 will not be visually distracted unnecessarily by recognizing the first warning lamp 22 or the second warning lamp 24 that is not emitting light.

B. Second Embodiment

1. Description of Overall Arrangement (Differences from the First Embodiment)

Figure 7:
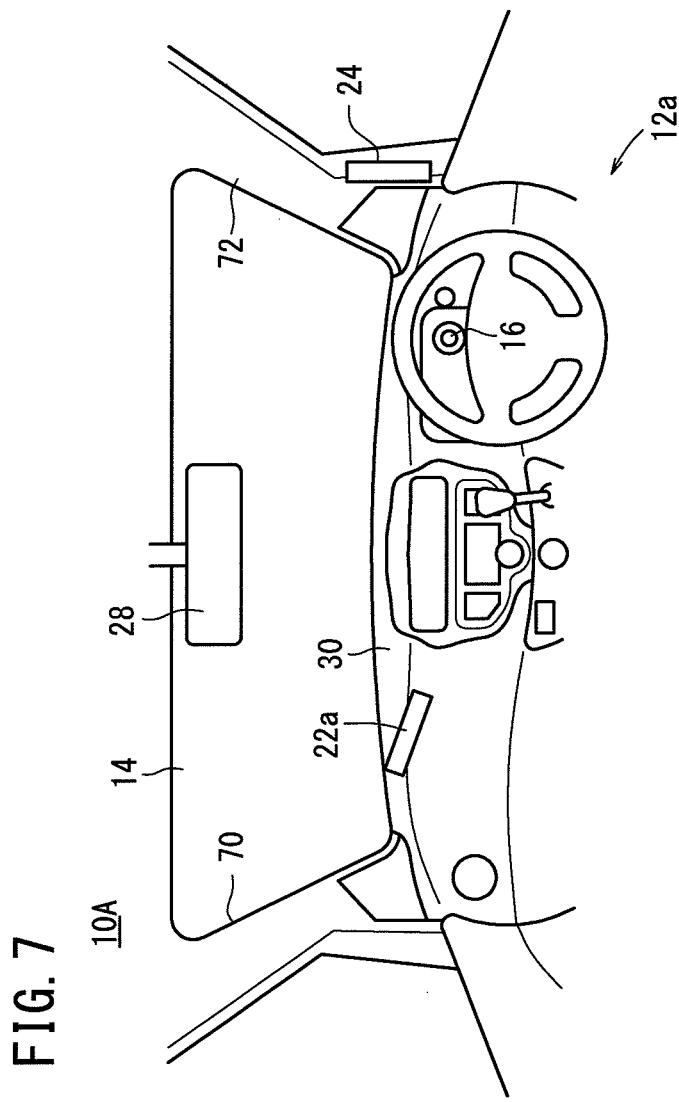
FIG. 7 is a view showing a peripheral area around a front windshield according to a second embodiment of the present invention.

FIG. 7 is a view showing the peripheral area around a front windshield 14 of a vehicle 10A according to a second embodiment of the present invention. The vehicle 10A according to the second embodiment is basically of the same arrangement as the vehicle 10 according to the first embodiment. However, the first and second embodiment differ from each other in that, while the first warning lamp 22 according to the first embodiment is of a vertically elongate shape that extends in a vertical direction, a first warning lamp 22*a* according to the second embodiment is of a horizontally elongate shape that extends in a horizontal direction on the instrument panel 30.

Figure 8:
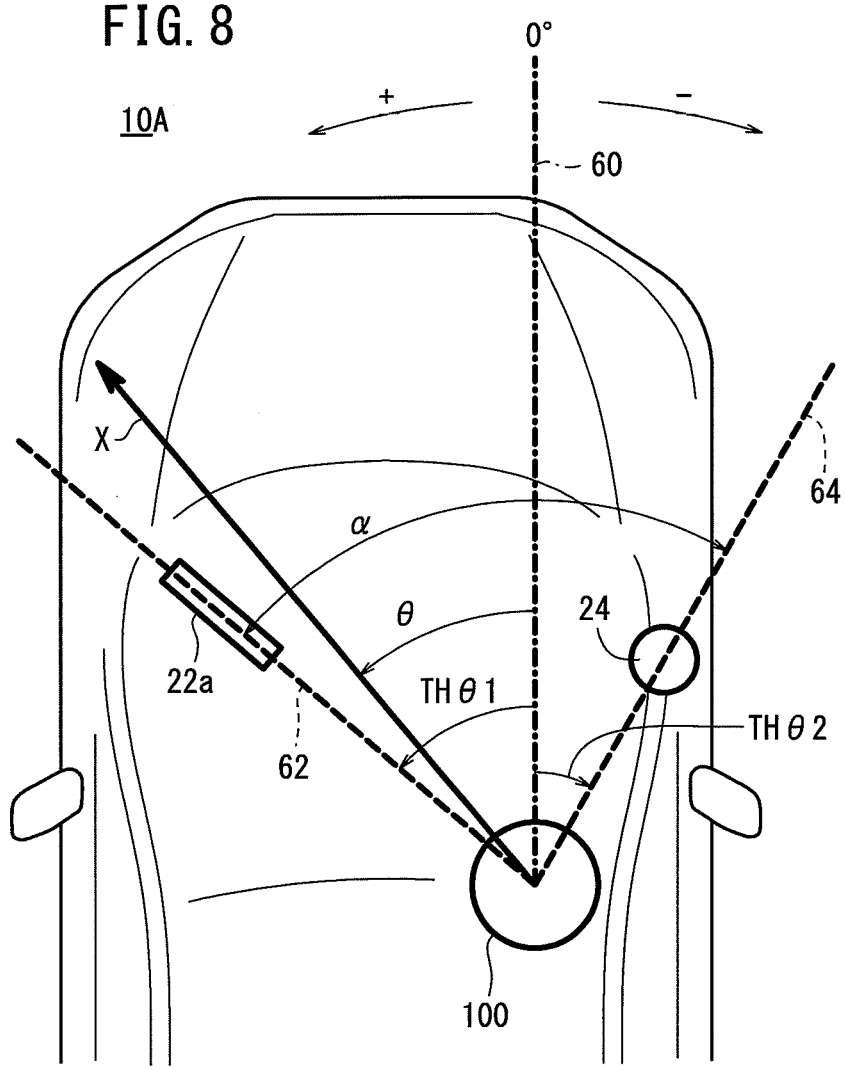
FIG. 8 is a plan view illustrating the layout of a first warning lamp and a second warning lamp according to the second embodiment.
Figure 9:
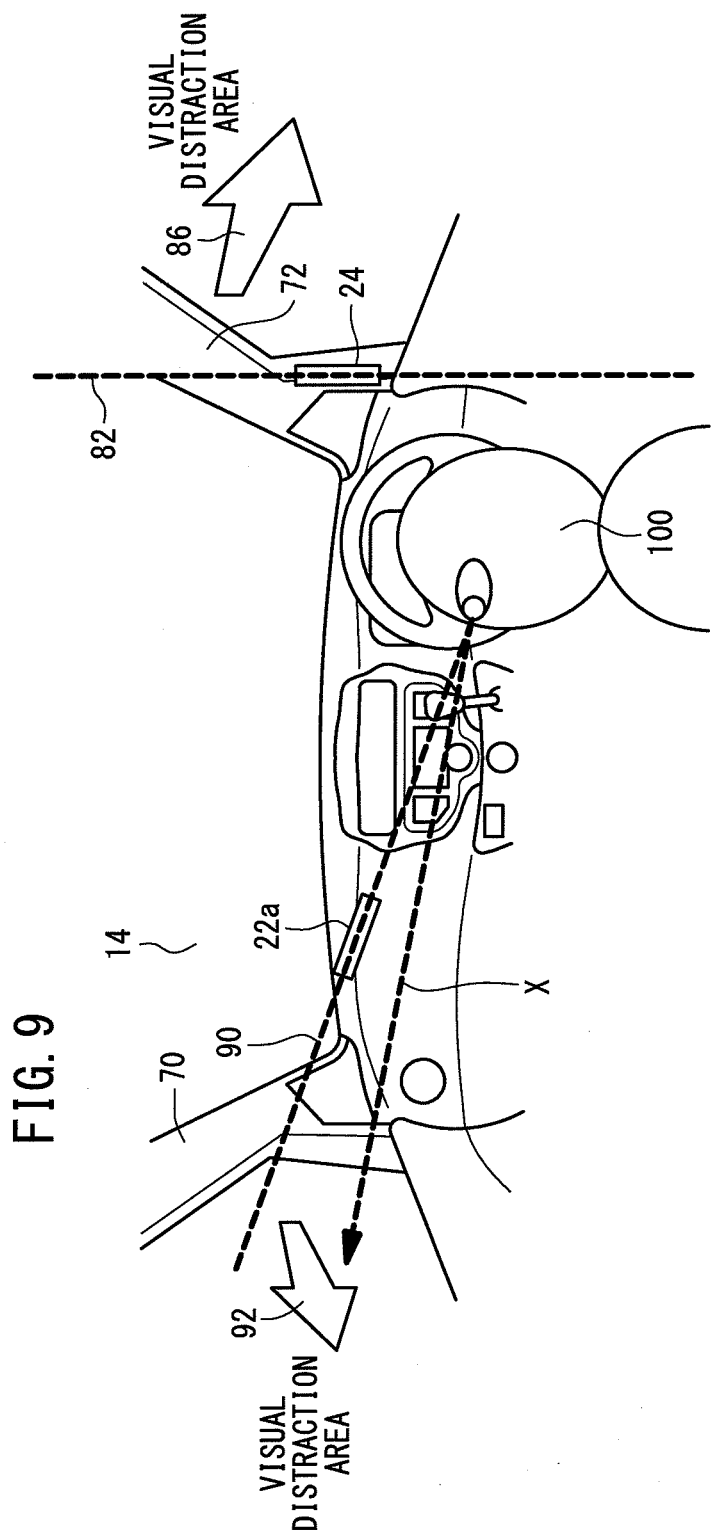
FIG. 9 is a view of the peripheral area around the front windshield, illustrating the relationship between the layout of the first warning lamp and the second warning lamp, and visual distraction areas according to the second embodiment.
Figure 10:
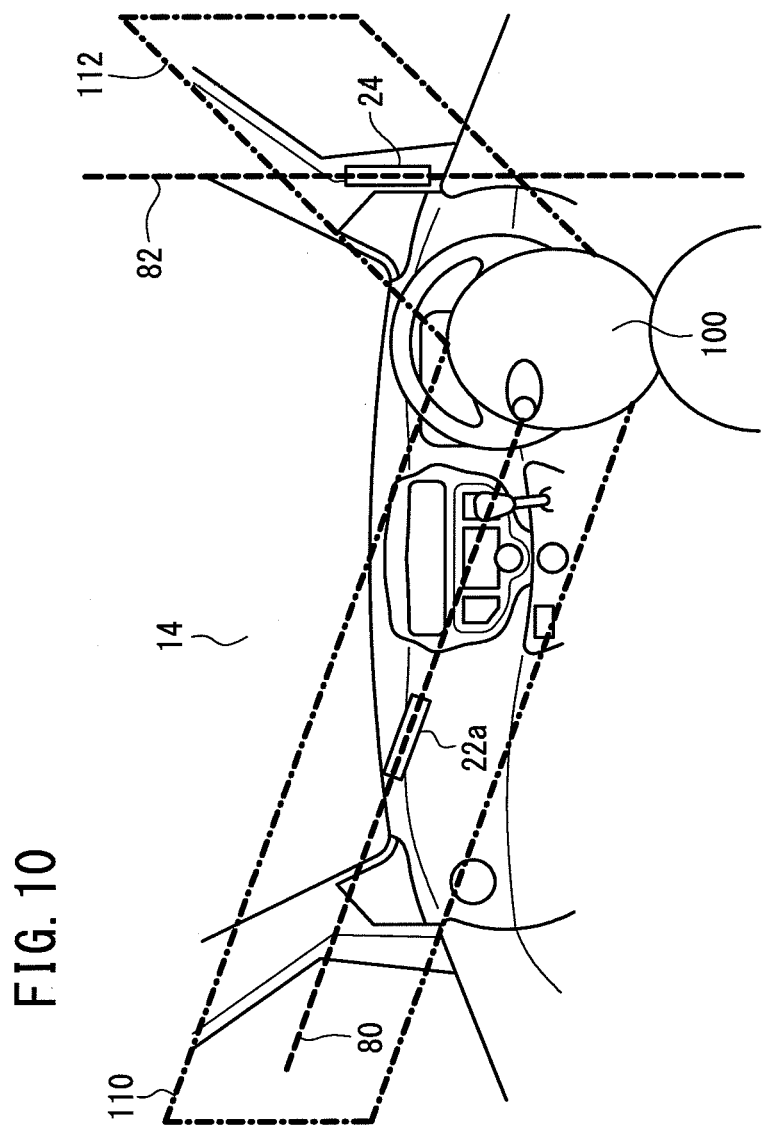
FIG. 10 is a view of the peripheral area around the front windshield, illustrating an effect produced by the presence of the first warning lamp and the second warning lamp according to the second embodiment.
Figure 11:
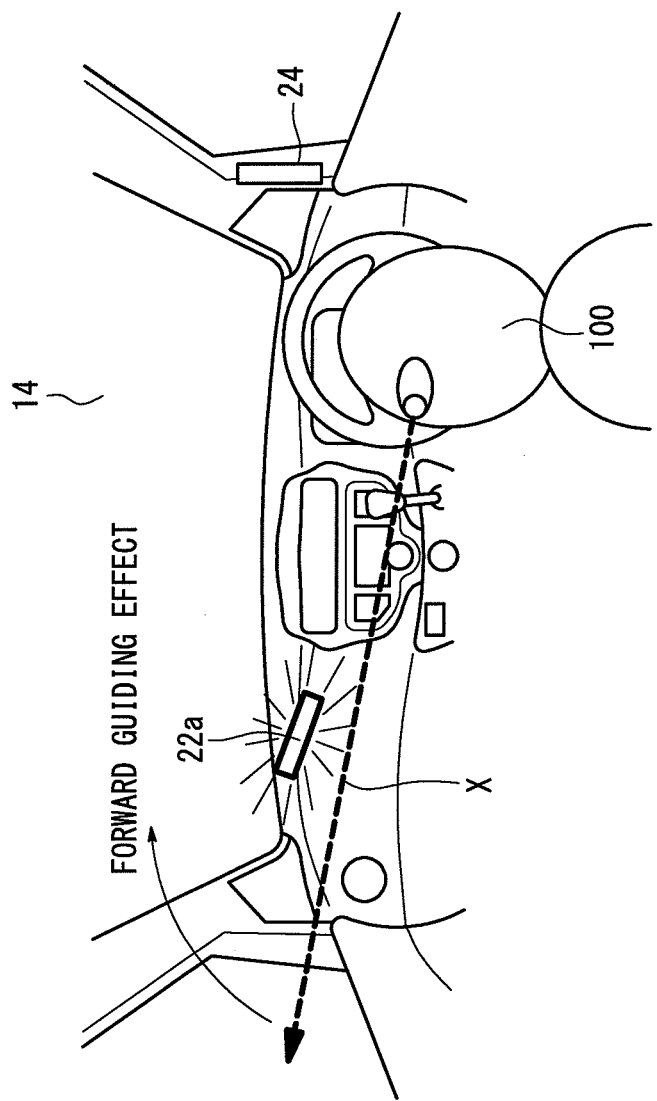
FIG. 11 is a view of the peripheral area around the front windshield, illustrating an effect produced when the first warning lamp according to the second embodiment lights.

2. Layout of First Warning Lamp 22*a* and Second Warning Lamp 24, and Visual Distraction Areas FIG. 8 is a plan view illustrating the layout of the first warning lamp 22*a* and the second warning lamp 24. FIG. 9 is a view of a peripheral area around the front windshield 14, illustrating the relationship between the layout of the first warning lamp 22*a* and the second warning lamp 24, and visual distraction areas. FIG. 10 is a view of the peripheral area around the front windshield 14, illustrating an effect produced by the presence of the first warning lamp 22*a* and the second warning lamp 24. FIG. 11 is a view of the peripheral area around the front windshield 14, illustrating an effect produced when the first warning lamp 22*a* lights.

In FIG. 8, the central line 60, the gazing direction X, the gazing angle θ, the non-visual-distraction area α, the boundary lines 62, 64, and the threshold values THθ1, THθ2 are defined basically in the same manner as they are in FIG. 3. However, instead of the first warning lamp 22 according to the first embodiment, the first warning lamp 22*a* according to the second embodiment is disposed on the left boundary line 62. Stated otherwise, the boundary line 62 represents a line interconnecting the center of the driver 100 and the first warning lamp 22*a*.

According to the second embodiment, the first warning lamp 22*a* is in the form of a rod and is disposed in a horizontal direction along the boundary line 62 on the instrument panel 30. The horizontal direction referred to above represents a direction in a range from 0 to ±30° from a perfect horizontal direction (0°) longitudinally and transversely of the vehicle 10.

In FIG. 9, reference numeral "90" denotes a hypothetical line (hereinafter referred to as a "horizontal axis 90") representing the longitudinal axis of the first warning lamp 22*a*. The horizontal axis 90 is in alignment with the boundary line 62, at least when viewed in plan. In FIG. 9, an area indicated by the arrow 92, i.e., an area faced by the driver 100 on the left-hand side of the horizontal axis 90 (counterclockwise), is referred to as a visual distraction area. Similar to the first embodiment, an area indicated by the arrow 86, i.e., an area faced by the driver 100 on the right-hand side of the second axis 82 (clockwise), also is referred to as a visual distraction area.

Accordingly, even if the first warning lamp 22*a* and the second warning lamp 24 are not made to light or blink, using the first warning lamp 22*a* and the second warning lamp 24 as marks, the driver 100 is able to recognize the visual distraction areas. According to the second embodiment, in particular, the first warning lamp 22*a* is disposed along a horizontal direction on the instrument panel 30, whereas the second warning lamp 24 is disposed along a vertical direction on the front right pillar 72. Therefore, as shown in FIG. 10, the driver 100 finds it easy to recall hypothetical vertical planes (hereinafter referred to as "non-visual-distraction boundary planes 110, 112" or simply "boundary planes 110, 112") including the boundary lines 62, 64, thereby making it easy to grasp an area (space) within which the driver 100 is judged as being visually distracted, and an area (space) within which the driver 100 is not judged as being visually distracted.

Further, when the first warning lamp 22*a* or the second warning lamp 24 is made to light or blink upon a visual distraction of the driver 100, the first warning lamp 22*a* or the second warning lamp 24 makes it easy for the driver 100 to realize the visual distraction. Since the attention of the driver 100 is drawn to the first warning lamp 22*a* or the second warning lamp 24, which is made to light or blink, an effect (forward guiding effect) can be expected in which the gazing direction X of the driver 100 is guided toward the central line 60 (see FIG. 11).

3. Control Process of the Second Embodiment

The operational sequence of a visual distraction warning apparatus 12*a* according to the second embodiment upon detection of a visual distraction is the same as that according to the first embodiment, and is carried out according to the flowchart shown in FIG. 6.

4. Advantages of the Second Embodiment

As described above, the second embodiment offers the following advantages in addition to or instead of the advantages according to the first embodiment.

According to the second embodiment, each of the first warning lamp 22*a* and the second warning lamp 24 is in the form of a rod that extends along one of the visual distraction judgment boundary lines 62, 64, and issues a visual warning by emitting light. Therefore, the driver 100 finds it easy to recall the visual distraction judgment boundary lines 62, 64 per se, which are used to judge whether or not the driver 100 is visually distracted, i.e., to judge whether a visual warning should be issued or not. Consequently, when the gazing direction X is about to move beyond the visual distraction judgment boundary lines 62, 64, it can be expected that the driver 100 will not be visually distracted unnecessarily by recognizing the first warning lamp 22*a* or the second warning lamp 24 that is not emitting light.

According to the second embodiment, the first warning lamp 22*a* is disposed horizontally on the instrument panel 30. Therefore, the driver 100 finds it easy to recall the visual distraction judgment boundary line 62 without the vision of the driver 100 being obstructed. Furthermore, the driver 100 is prompted to recall the visual distraction judgment boundary line 62 by imaging the boundary line 62 as extending farther.

According to the second embodiment, the boundary lines 62, 64 are set on both left and right sides with respect to the front of the driver 100. In addition, the first warning lamp 22*a* is disposed horizontally along the boundary line 62 remotely from the driver 100, whereas the second warning lamp 24 is disposed vertically along the boundary line 64 proximate to the driver 100.

Since the first warning lamp 22*a* extends in a horizontal direction, the first warning lamp 22*a* prompts the driver 100 to recall a horizontal direction in the boundary plane 110, which includes the boundary line 62. Since the second warning lamp 24 extends in a vertical direction, the second warning lamp 24 prompts the driver 100 to recall a vertical direction in the boundary plane 112, which includes the other boundary line 64. Consequently, the positions of the first warning lamp 22*a* and the second warning lamp 24 are combined in a manner to prompt the driver 100 easily to recall the boundary plane 110 and the boundary plane 112, thereby prompting the driver 100 to recall spatial boundaries (the boundary plane 110 and the boundary plane 112), which are used to judge whether or not the driver 100 is visually distracted.

C. Modifications

The present invention is not limited to the above embodiments, but various arrangements may be adopted based on the disclosure of the present description. For example, the present invention may adopt the following arrangements.

1. Objects Capable of Incorporating the Visual Distraction Detecting Apparatus and Applications Thereof In the above embodiments, the warning apparatus 12, 12*a* is incorporated in a vehicle 10, 10A. However, the warning apparatus 12, 12*a* may be incorporated in other types of objects. For example, the warning apparatus 12, 12*a* may be incorporated in mobile objects such as ships, aircrafts, etc. The warning apparatus 12, 12*a* is not limited to being incorporated in mobile bodies, but may be incorporated in other apparatus that have a need to detect when occupants thereof are visually distracted.

2. Visual Distraction Judging Process

According to the above embodiments, a visual distraction is judged by the process described with reference to FIG. 3 or FIG. 8. However, a visual distraction may be judged by any processes, insofar as such processes are capable of judging whether or not an operator such as the driver 100 or the like is visually distracted.

3. First Warning Lamps 22, 22*a* and Second Warning Lamp 24

In the first embodiment, the first warning lamp 22 is disposed on the front left pillar 70, and the second warning lamp 24 is disposed on the front right pillar 72. In the second embodiment, the first warning lamp 22*a* is disposed on the instrument panel 30, and the second warning lamp 24 is disposed on the front right pillar 72. However, the first warning lamps 22, 22*a* and the second warning lamp 24 are not limited in position to the illustrated positions, but may be disposed in any positions insofar as the first warning lamps 22, 22*a* and the second warning lamp 24 are disposed on the boundary lines 62, 64.

In the above embodiments, the two warning lamps (the first warning lamp 22, 22*a* and the second warning lamp 24) are employed. However, in each of the aforementioned embodiments, only a single warning lamp may be employed, or a plurality of warning lamps may be disposed on either one of the boundary line 62 or the boundary line 64.

The invention claimed is:

1. A warning apparatus comprising:
   a gazing direction detecting unit for detecting a gazing direction of an occupant of a vehicle based on a viewing direction or a facial direction of the occupant;
   a visual distraction judging unit for judging that the occupant is visually distracted if the gazing direction of the occupant is angularly spaced from a front direction of the occupant by a predetermined angle or greater; and
   a warning unit for issuing a visual warning at a position that can be recognized visually by the occupant if the visual distraction judging unit judges that the occupant is visually distracted,
   wherein the warning unit is disposed at a predetermined position in an interior of the vehicle on at least one hypothetical boundary line, the at least one hypothetical boundary line being positioned at the predetermined angle from the front direction of the occupant on at least one of left and right sides of the front direction of the occupant so that the at least one hypothetical boundary line represents a boundary for judging whether the occupant is visually distracted based on the gazing direction.

2. The warning apparatus according to claim 1, wherein the warning unit is in the form of a rod that extends along the hypothetical boundary line, and issues the visual warning by emitting light.

3. The warning apparatus according to claim 1, wherein the warning unit comprises a first light emitter disposed in a horizontal direction along an instrument panel of the vehicle.

4. The warning apparatus according to claim 3, wherein the hypothetical boundary line comprises two hypothetical boundary lines disposed respectively on the left and right sides of the front direction of the occupant;
   the first light emitter is disposed on one of the hypothetical boundary lines on one of the left and right sides that is remote from the occupant; and
   the warning unit further comprises a second light emitter disposed in a vertical direction on the other of the hypothetical boundary lines on the other of the left and right sides that is proximate to the occupant.

* * * * *